United States Patent
Huehn

(10) Patent No.: US 11,354,132 B2
(45) Date of Patent: Jun. 7, 2022

(54) LOAD BALANCING OF TWO PROCESSORS WHEN EXECUTING DIVERSE-REDUNDANT INSTRUCTION SEQUENCES

(71) Applicant: WAGO Verwaltungsgesellschaft mbH, Minden (DE)

(72) Inventor: Thomas Huehn, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 17/172,897

(22) Filed: Feb. 10, 2021

(65) Prior Publication Data

US 2021/0247983 A1    Aug. 12, 2021

(30) Foreign Application Priority Data

Feb. 10, 2020   (DE) .................. 10 2020 103 349.4

(51) Int. Cl.
*G06F 9/30* (2018.01)
*G06F 9/38* (2018.01)

(52) U.S. Cl.
CPC .......... *G06F 9/3851* (2013.01); *G06F 9/3017* (2013.01); *G06F 9/30145* (2013.01); *G06F 9/3802* (2013.01); *G06F 9/3889* (2013.01)

(58) Field of Classification Search
CPC .. G06F 9/30145; G06F 9/3017; G06F 9/3889; G06F 9/5083
See application file for complete search history.

(56) References Cited

U.S. PATENT DOCUMENTS

| 10,956,162 | B2* | 3/2021 | Clancy .................. G06F 9/3824 |
| 2007/0203910 | A1* | 8/2007 | Ferguson ................ G06F 16/27 |
| 2020/0089919 | A1* | 3/2020 | Courousse .............. G06F 21/75 |

OTHER PUBLICATIONS

Larsen et al.; SoK: Automated Software Diversity; 2014; IEEE (Year: 2014).*
Cox et al.; N-Variant Systems: A Secretless Framework for Security through Diversity; 2006; USENIX (Year: 2006).*
Crane; Enhancing and Extending Software Diversity; 2015; California Digital Library, University of California (Year: 2015).*
Buys et al; Towards Context-Aware Adaptive Fault Tolerance in SOA Applications. In: DEBS '11: Proceedings of the 5$^{th}$ ACM international conference on distributed event-based systems, Jul. 2011, pp. 63-74.
Olszewski et al.; Kendo: Efficient Deterministic Multithreading in Software. ACM SIGARCH Computer Architecture News, Mar. 2009. pp. 97-108.

* cited by examiner

*Primary Examiner* — Corey S Faherty
(74) *Attorney, Agent, or Firm* — Muncy, Geissler, Olds & Lowe, P.C.

(57) ABSTRACT

A method and a system are presented for load balancing of two processors when executing diverse-redundant instruction sequences.

10 Claims, 4 Drawing Sheets

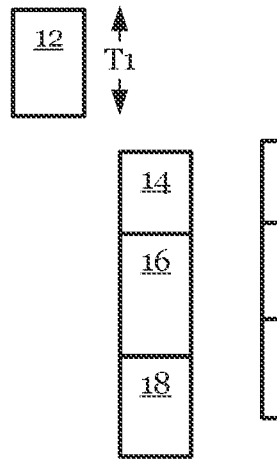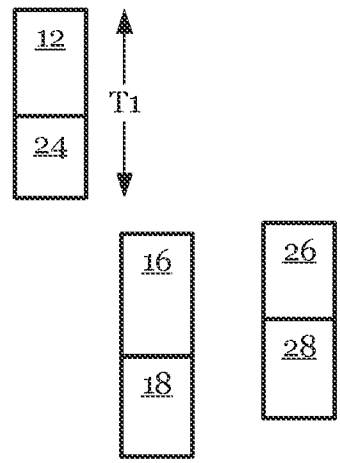
Fig. 3a                                     Fig. 3b
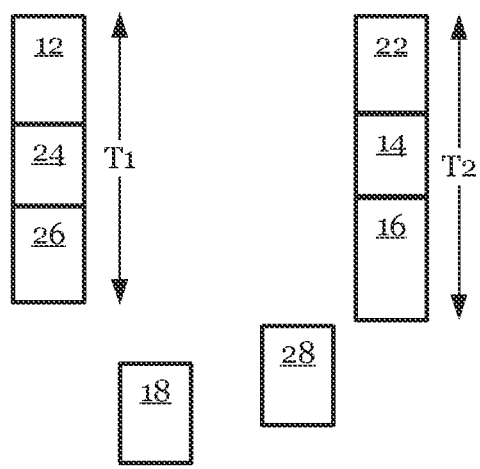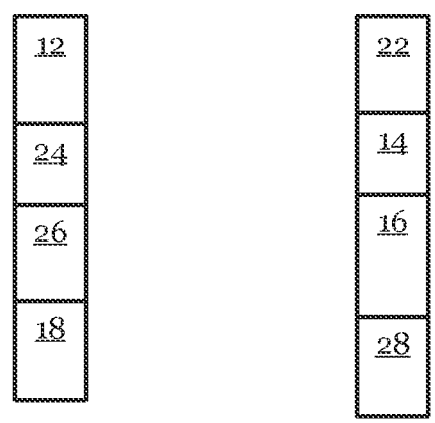
Fig. 3c                                     Fig. 3d

LOAD BALANCING OF TWO PROCESSORS WHEN EXECUTING DIVERSE-REDUNDANT INSTRUCTION SEQUENCES This nonprovisional application claims priority under 35 U.S.C. § 119(a) to German Patent Application No. 10 2020 103 349.4, which was filed in Germany on Feb. 10, 2020 and which is herein incorporated by reference.

BACKGROUND OF THE INVENTION

Field of the Invention

The present invention relates to a method and a system for load balancing of two processors when executing diverse-redundant instruction sequences.

Description of the Background Art

Diverse-redundant instruction sequences can, for example, be instruction sequences which (in the error-free case) lead to the same result (for example, to the same state of a device or a system), but are (deliberately) not made identical, e.g., in their structure in order (among other things) to prevent two (or more) of the diverse-redundant instruction sequences (in an error case) from generating the same incorrect result, which would make the detection of an error case more difficult or possibly impossible.

SUMMARY OF THE INVENTION

It is therefore an object of the present invention to provide a first instruction sequence and a second instruction sequence, wherein the first instruction sequence is directed to achieving a first result and the second instruction sequence is directed to achieving a second result, wherein the second result is redundant to the first result, dividing the first instruction sequence into first instruction blocks, dividing the second instruction sequence into second instruction blocks, assigning the first instruction blocks to a first processor and to a second processor, assigning the second instruction blocks to a first processor and to a second processor, executing the first instruction blocks, assigned to the first processor, and the second instruction blocks, assigned to the first processor, by the first processor, and executing the first instruction blocks, assigned to the second processor, and the second instruction blocks, assigned to the second processor, by the second processor.

In this regard, the term "instruction sequence," can be understood to be, for example, a sequence of machine-readable instructions, for example, a sequence of instructions written in a programming language. In this context, the term "instruction," can be understood to be, for example, a command or a functional compilation of commands that can be interpreted or implemented by a processor in accordance with an instruction set on which the architecture of the processor is based.

Further, the term "result," can be understood to be, for example, the state of a device that results when said device is controlled on the basis of the instructions by the processor. Therefore, the term "redundant results," can be understood to be, for example, identical (or at least functionally identical) states.

Furthermore, the phrase "dividing . . . into instruction blocks," can be understood to be, for example, the grouping of instructions, wherein an instruction group typically includes instructions building on one another. For example, a program analysis can identify program points beyond which there are no "backward" control or data flow dependencies or only those that can be resolved (for example, by an optimizer).

The grouping can be carried out further so that for some or every first instruction block, there is a second instruction block redundant thereto and vice versa. If there are dependencies between multiple first instruction blocks, it can be provided that these are distributed to different processors only if the corresponding redundant second instruction blocks are distributed to the processors inversely thereto. Thus, the phrase "assigning . . . to the first processor and to the second processor," can be understood to be, for example, specifying a plan that indicates how the instruction blocks of an instruction sequence are distributed to the processors.

Further, the expression "dividing the . . . assigned . . . into instruction blocks," can be understood to be, for example, the execution of the instructions in the blocks (according to a block sequence). Furthermore, the term "processor," can be understood to be, for example, an electronic circuit that processes commands, wherein the commands as such are fixed, whereas the compilation of a command sequence is freely programmable.

The method preferably further comprises determining a first indicator for an execution time of the first instruction blocks and determining a second indicator for an execution time of the second instruction blocks, wherein the first and second indicators are each based on single or multiple values and wherein the assigning of the first instruction blocks to the first processor and to the second processor and the assigning of the second instruction blocks to the first processor and to the second processor take place with consideration of the first and second indicators.

For example, the instruction sequences or blocks can be generated from a common source code using different runtime optimization algorithms. The runtime optimization algorithms can differ, e.g., in how aggressively the optimization is carried out, which can have the result that the instruction sequences accordingly have different execution times.

The source code can, for example, be a function plan code that is based on otherwise largely independent networks, which favors division into instruction blocks.

Preferably, assigning the first instruction blocks and assigning the second instruction blocks comprise estimating or calculating a first total execution time of the instruction blocks, assigned to the first processor, and a second total execution time of the instruction blocks, assigned to the second processor, for some or all possible assignment variants.

In this regard, the term "total execution time," can be understood to be, for example, the period of time required by a processor to execute all instruction blocks assigned to the processor.

Preferably, the instruction blocks are distributed among the processors in successive assignment rounds and an instruction block, having a relatively shorter execution time, of the instruction blocks, to be assigned in this assignment round, is assigned in a subsequent assignment round to the processor to which instruction blocks with an overall longer execution time are assigned after an assignment round.

Preferably, the first instruction blocks are assigned in a nested manner to the first processor and to the second processor and the second instruction blocks are assigned in a nested manner to the second processor and to the first processor, wherein the nested assignment in particular comprises an alternating assignment.

Preferably, the method further comprises generating the second instruction sequence from the first instruction sequence by means of runtime optimization.

Preferably, the method further comprises generating the first instruction sequence as a first runtime-optimized version of an output instruction sequence and generating the second instruction sequence as a second runtime-optimized version of the output instruction sequence.

Preferably, at least some of the first instruction blocks can be executed independently of other first instruction blocks and at least some of the second instruction blocks can be executed independently of other second instruction blocks.

The first instruction blocks, assigned to the first processor, and the second instruction blocks, assigned to the first processor, are preferably executed cyclically by the first processor and the first instruction blocks, assigned to the second processor, and the second instruction blocks, assigned to the second processor, are executed cyclically by the second processor, wherein a cycle time, after which the instruction blocks, assigned to the first processor, and the instruction blocks, assigned to the second processor, are executed again is derived from the total execution time of the first processor, which takes longer to execute the instruction blocks assigned to it, and third instruction blocks, which are to be executed cyclically and are different from the first and second instruction blocks, are allocated to the second processor.

The third instruction blocks can relate, for example, to diagnostic instructions, communication instructions, data processing instructions, etc. For example, the third instruction blocks can relate to a bus connection.

A system of the invention comprises a first processor and a second processor, wherein the system is configured to divide a first instruction sequence, which is directed to achieving a first result, into first instruction blocks, and to divide a second instruction sequence, which is directed to achieving a second result, which is redundant to the first result, into second instruction blocks, to assign the first instruction blocks to the first processor and to the second processor, to assign the second instruction blocks to the first processor and to the second processor, to execute the first instruction blocks, assigned to the first processor, and the second instruction blocks, assigned to the first processor, by the first processor, and to execute the first instruction blocks, assigned to the second processor, and the second instruction blocks, assigned to the second processor, by the second processor.

In this regard, the terms "first," "second," etc., can be used used for differentiation. Thus, for example, the "first processor" does not mean the processor that is the first to complete a calculation, but, for example, only a processor different from the "second processor."

In addition, it is understood that the system can be configured to also carry out further steps of the method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein:

FIGS. 3a-3d illustrate an assignment strategy;

DETAILED DESCRIPTION

Figure 1:
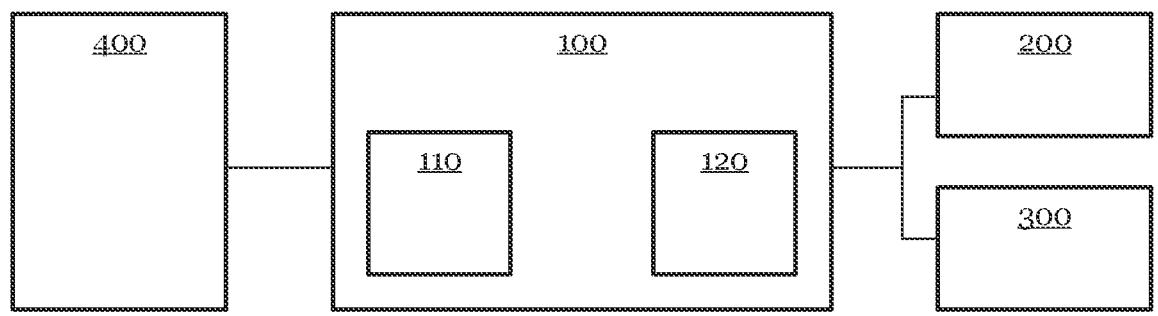
FIG. 1 shows a block diagram of a system of the invention.

FIG. 1 shows a system 100 comprising a first processor 110 and a second processor 120. System 100 can have, for example, two identical or two different microcontrollers which are functionally redundant to one another (at least partially). Further, system 100 can be configured to receive status data from a first field device 200 (for example, a sensor) and/or to control a second field device 300 (for example, an actuator) by means of control data generated on the basis of the status data.

Field devices 200, 300 can be connected to system 100, for example, via a bus. For example, system 100 can be designed as a fieldbus coupler or a fieldbus controller, which is connected via a bus (in particular via a local bus) to input/output modules to which field devices 200, 300 are connected. System 100 can be configured, for example, to make the data and services of field devices 200, 300 available, e.g., to a higher-level controller 400, which is connected to system 100 via a field bus, for example.

Figure 2:
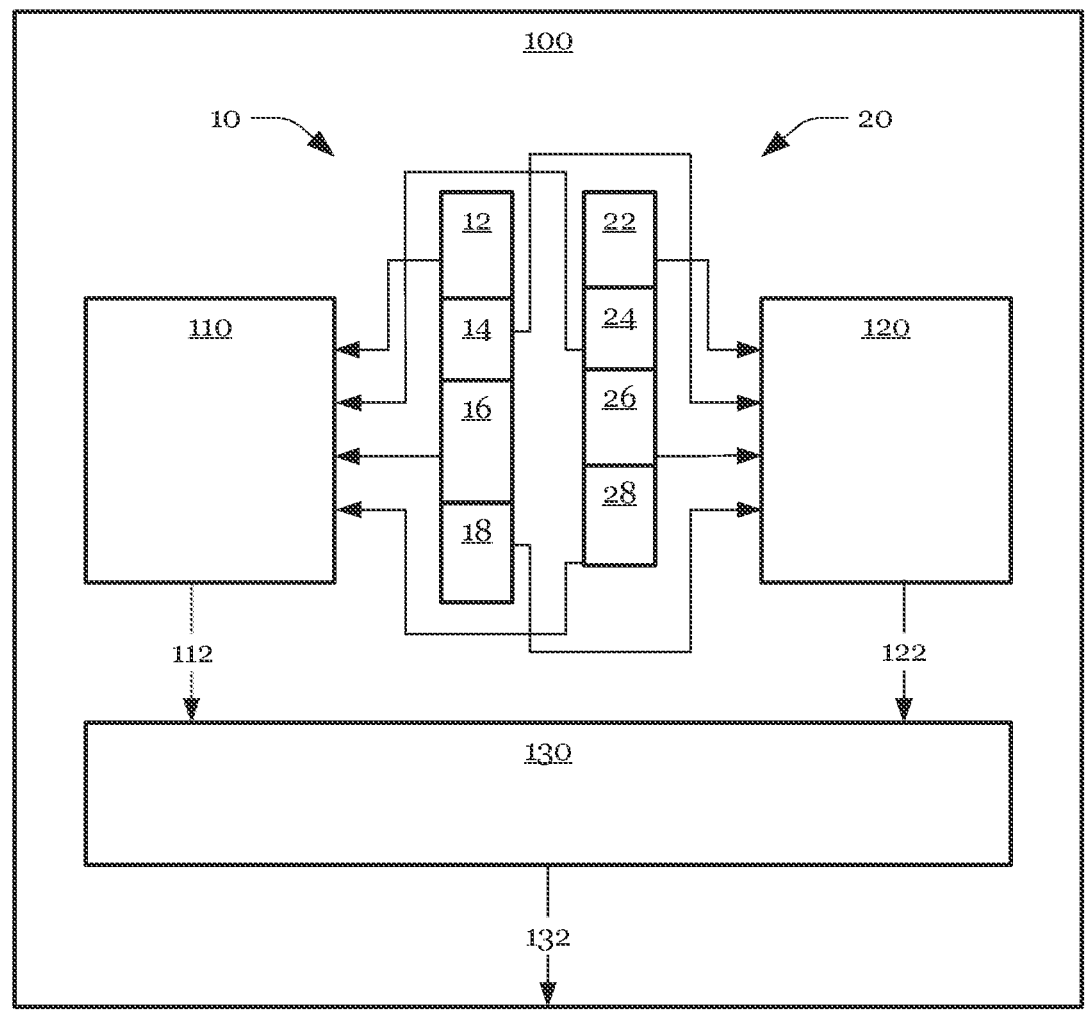
FIG. 2 illustrates the assignment of instruction blocks to processors of the system shown in FIG. 1.

As illustrated in FIG. 2, system 100 is configured to divide a first instruction sequence 10, which is directed to achieving a first result, into first instruction blocks 12, 14, 16, 18 and to divide a second instruction sequence 20, which is directed to achieving a second result, into second instruction blocks 22, 24, 26, 28. The division into instruction blocks 12, 14, 16, 18, 22, 24, 26, 28 can take place, for example, within the framework of an initial system configuration (e.g., within the framework of compiling) or it can be effected by higher-level controller 400 during runtime.

The results generated by the processing of instruction blocks 12, 14, 16, 18, 22, 24, 26, 28 by processors 110, 120 are redundant and can therefore be used to check the execution of instruction blocks 12, 14, 16, 18, 22, 24, 26, 28 for errors. For example, the results generated by the execution of instruction blocks 12, 14, 16, 18, 22, 24, 26, 28 can be checked by a verification unit 130. Verification unit 130 can check, for example, whether status signals or control signals 112, 122 generated by processors 110, 120 differ from one another. The verification can be either hardware-based or software-based. In addition, the verification can be carried out by one of processors 110, 120 instead of by verification unit 130.

If the status signals or control signals 112, 122 match or if a discrepancy between the status signals or control signals 112, 122 is within a tolerance range, verification circuit 130 can output a status signal or control signal 132 (or one of the status or control signals 112, 122) generated from both status or control signals 112, 122. If the status signals or control signals 112, 122 do not match or if a discrepancy between the status signals or control signals 112, 122 is outside a tolerance range, verification circuit 130 can output an error signal. The error signal can, for example, cause system 100 to be transferred to a safe state or to be restarted.

As illustrated in FIG. 2, system 100 can configured further to distribute first instruction blocks 12, 14, 16, 18 and second instruction blocks 22, 24, 26, 28 between first processor 110 and second processor 120, wherein first processor 110 executes first instruction blocks 12, 16, assigned to first processor 110, and second instruction blocks 24, 28, assigned to first processor 110, and the second processor 120 executes first instruction blocks 14, 18, assigned to second processor 120, and second instruction blocks 22, 26, assigned to second processor 120.

The distribution can take place so that first and second instruction blocks 12, 14, 16, 18, 22, 24, 26, 28 are alternately assigned to first processor 110 and to second processor 120, for example, if an execution time of instruction blocks 12, 14, 16, 18, 22, 24, 26, 28 cannot be determined or is not known or one of the instruction sequences 10, 20 has been (more) optimized and its instruction blocks 12, 14, 16, 18, 22, 24, 26, 28 therefore have relatively shorter runtimes.

Furthermore, as illustrated in FIGS. 3a, 3b, 3c, and 3d, the assignment process can take place in successive assignment rounds. In so doing, it can be determined in each assignment round whether instruction blocks 12, 14, 16, 18, 22, 24, 26, 28 with the longer runtime T1/T2 in total are assigned to first processor 110 or to second processor 120 and the shortest from instruction blocks 12, 14, 16, 18, 22, 24, 26, 28 to be assigned in the round is assigned to processor 110, 120, which currently has instruction blocks 12, 14, 16, 18, 22, 24, 26, 28 with the longest execution time T1/T2 in total. Further, additional tasks (for example, a bus connection) can be assigned to processor 110, 120, which has the reduced total execution time after the last round.

Figure 4:
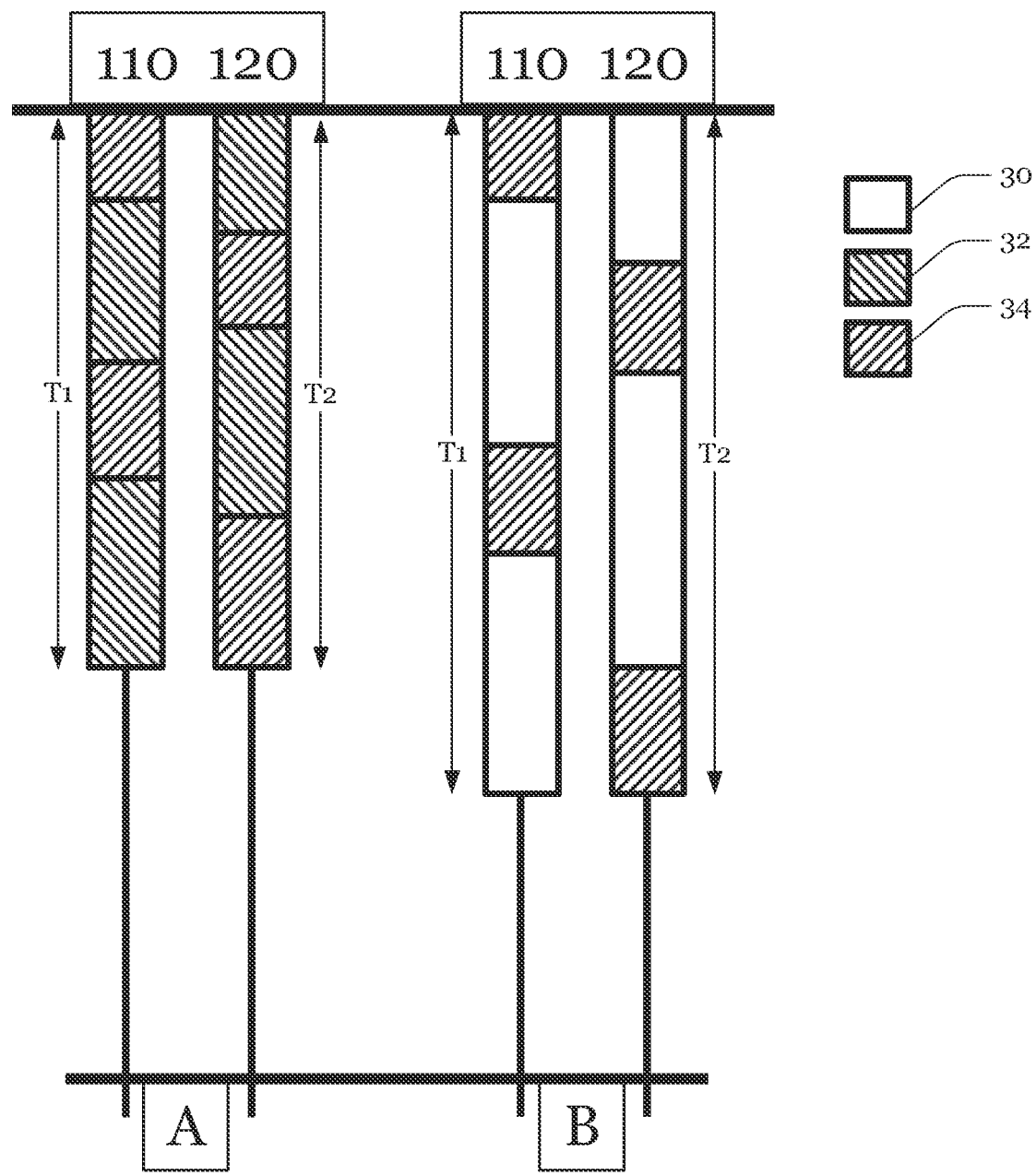
FIG. 4 shows two assignment examples.

In addition, as shown in FIG. 4, one or both instruction sequences 10, 20 can be based on the same source code which has been optimized or optimized to different degrees. Thus, FIG. 4 shows instruction blocks of a non-optimized instruction sequence 30, an optimized instruction sequence 32, and an aggressively optimized instruction sequence 34. As shown in example A, the instruction blocks of the optimized instruction sequences 32, 34 can be assigned to processors 110, 120 so that the lowest possible runtime deviation results, which can be advantageous, for example, if the instruction blocks are to be executed cyclically. For example, the total execution time T1, T2 required in each case by processors 110, 120 can be determined for each or some assignment options and a suitable assignment option can then be selected.

Further, as shown in example B, the instruction blocks of the non-optimized instruction sequence 30 and the aggressively optimized instruction sequence 34 can also be assigned to processors 110, 120 so that the smallest possible runtime deviation results. Because in this case a non-optimized instruction sequence 30 is also used apart from the aggressively optimized instruction sequence 34, only one optimization process (or only one optimizer) is required.

Figure 5:
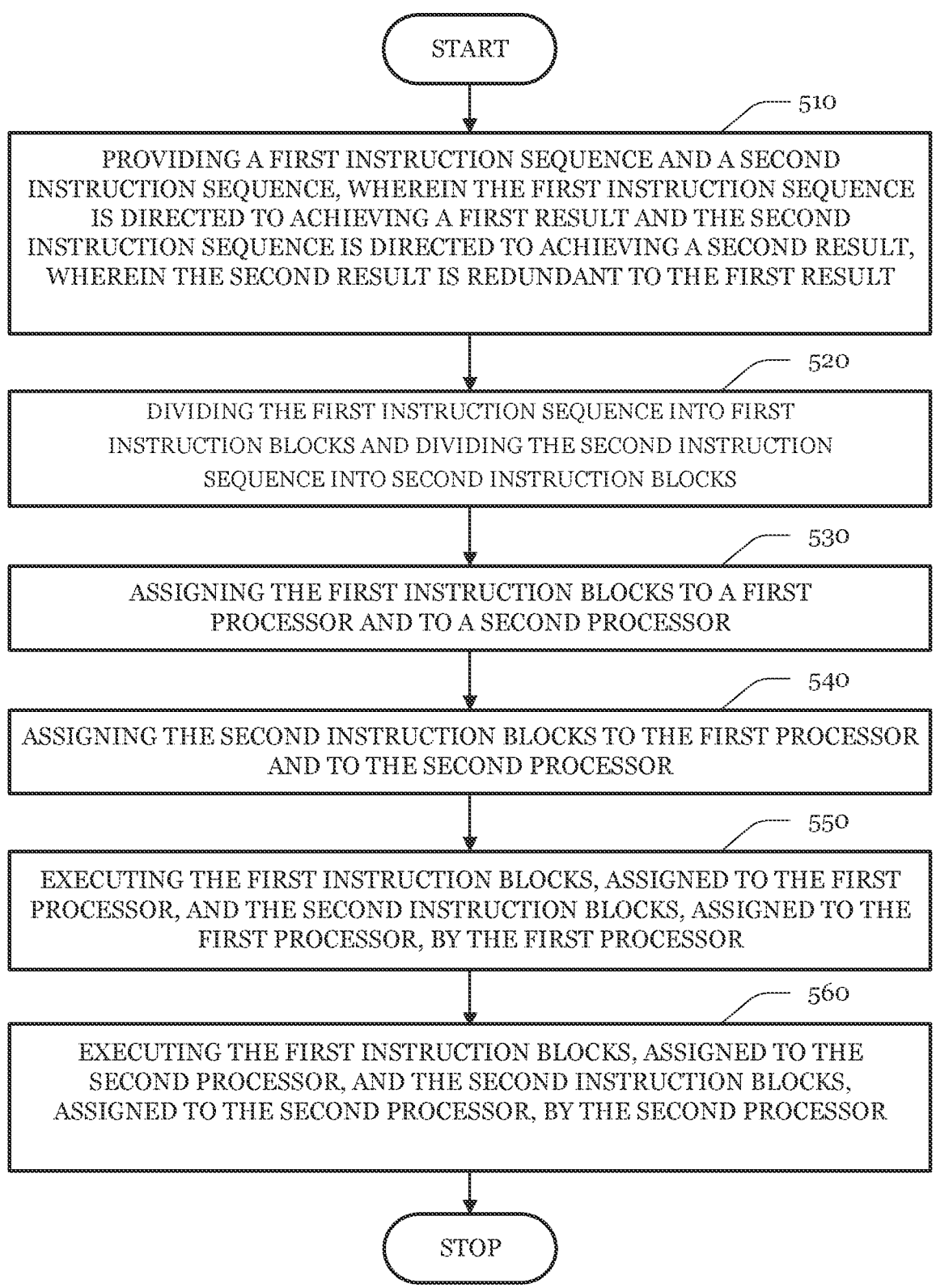
FIG. 5 shows a flowchart of a method of the invention.

FIG. 5 shows a flowchart of the method of the invention. The method in step 510 begins with providing a first instruction sequence 10, 20, 30, 32, 34 and a second instruction sequence 10, 20, 30, 32, 34, wherein first instruction sequence 10, 20, 30, 32, 34 is directed to achieving a first result and second instruction sequence 10, 20, 30, 32, 34 is directed to achieving a second result and both results are redundant to one another. In step 520, first instruction sequence 10, 20, 30, 32, 34 is divided into first instruction blocks 12, 14, 16, 18 and second instruction sequence 10, 20, 30, 32, 34 into second instruction blocks 22, 24, 26, 28. In step 530, first instruction blocks 12, 14, 16, 18 are assigned to first processor 110 and to second processor 120, and in step 540, second instruction blocks 22, 24, 26, 28 are assigned to first processor 110 and to second processor 120. After the assignment, in step 550, first instruction blocks 12, 16, assigned to first processor 110, and second instruction blocks 24, 28, assigned to first processor 110, are executed by first processor 110, and in step 560, first instruction blocks 14, 18, assigned to second processor 120, and second instruction blocks 22, 26, assigned to second processor 120, are executed by second processor 120.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for load balancing of two processors when executing diverse-redundant instruction sequences, the method comprising:
   providing a first instruction sequence and a second instruction sequence, the first instruction sequence being directed to achieving a first result and the second instruction sequence being directed to achieving a second result, the second result being redundant to the first result;
   dividing the first instruction sequence into first instruction blocks;
   dividing the second instruction sequence into second instruction blocks;
   assigning the first instruction blocks to a first processor and to a second processor;
   assigning the second instruction blocks to the first processor and to the second processor;
   executing the first instruction blocks assigned to the first processor and the second instruction blocks assigned to the first processor by the first processor; and
   executing the first instruction blocks assigned to the second processor and the second instruction blocks assigned to the second processor by the second processor.

2. The method according to claim 1, further comprising:
   determining a first indicator for an execution time of the first instruction blocks; and
   determining a second indicator for an execution time of the second instruction blocks,
   wherein the first and second indicator are each based on single or multiple values, and
   wherein the assigning of the first instruction blocks to the first processor and to the second processor and the assigning of the second instruction blocks to the first processor and to the second processor takes place with consideration of the first and second indicators.

3. The method according to claim 2, wherein assigning the first instruction blocks and assigning the second instruction blocks comprise estimating or calculating a first total execution time of the instruction blocks assigned to the first processor and a second total execution time of the instruction blocks assigned to the second processor for some or all possible assignment variants.

4. The method according to claim 2, wherein the instruction blocks are distributed among the processors in successive assignment rounds, and wherein an instruction block having a relatively shorter execution time, of the instruction blocks to be assigned in this assignment round is assigned in a subsequent assignment round to the to which the instruction blocks with an overall longer execution time are assigned after an assignment round.

5. The method according to claim 1, wherein the first instruction blocks are assigned in a nested manner to the first processor and to the second processor and the second instruction blocks are assigned in a nested manner to the second processor and to the first processor, and wherein the nested assignment comprises an alternating assignment.

6. The method according to claim 1, further comprising: generating the second instruction sequence from the first instruction sequence via runtime optimization.

7. The method according to claim 1, further comprising:
generating the first instruction sequence as a first runtime-optimized version of an output instruction sequence; and
generating the second instruction sequence as a second runtime-optimized version of the output instruction sequence.

8. The method according to claim 1, wherein at least some of the first instruction blocks are executed independently of other first instruction blocks, and wherein at least some of the second instruction blocks are executed independently of other second instruction blocks.

9. The method according to claim 1, wherein the first instruction blocks assigned to the first processor and the second instruction blocks assigned to the first processor are executed cyclically by the first processor,
wherein the first instruction blocks assigned to the second processor and the second instruction blocks assigned to the second processor are executed cyclically by the second processor,
wherein a cycle time is derived from a total execution time of whichever processor of the first processor or the second processor takes longer to execute the instruction blocks assigned to it, after the cycle time is derived, the instruction blocks assigned to the first processor and the instruction blocks assigned to the second processor are executed again or re-assigned, and
wherein third instruction blocks, which are to be executed cyclically and are different from the first and second instruction blocks, are allocated to the second processor.

10. A system comprising:
a first processor; and
a second processor;
wherein the system is configured:
to divide a first instruction sequence, which is directed to achieving a first result, into first instruction blocks and to divide a second instruction sequence, which is directed to achieving a second result, which is redundant to the first result, into second instruction blocks;
to assign the first instruction blocks to the first processor and to the second processor;
to assign the second instruction blocks to the first processor and to the second processor;
to execute the first instruction blocks assigned to the first processor and the second instruction blocks assigned to the first processor by the first processor; and
to execute the first instruction blocks assigned to the second processor and the second instruction blocks assigned to the second processor by the second processor.

* * * * *